(12) United States Patent
Iwami (10) Patent No.: US 8,865,042 B2
(45) Date of Patent: Oct. 21, 2014

(54) MOLD FOR THERMOPLASTIC RESIN MOLDING, CAVITY MOLD, AND PROCESS FOR PRODUCING THE CAVITY MOLD

(75) Inventor: Hiroyuki Iwami, Osaka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 855 days.

(21) Appl. No.: 12/299,267

(22) PCT Filed: May 2, 2007

(86) PCT No.: PCT/JP2007/059396
§ 371 (c)(1),
(2), (4) Date: Nov. 6, 2009

(87) PCT Pub. No.: WO2007/129673
PCT Pub. Date: Nov. 15, 2007

(65) Prior Publication Data
US 2010/0183761 A1 Jul. 22, 2010

(30) Foreign Application Priority Data
May 2, 2006 (JP) ................................. 2006-154037

(51) Int. Cl.
*B29C 33/38* (2006.01)
*B29C 33/02* (2006.01)
*B28B 7/40* (2006.01)
*B23P 15/00* (2006.01)
*B29C 45/37* (2006.01)
*B29C 45/73* (2006.01)

(52) U.S. Cl.
CPC ......... *B29C 33/3842* (2013.01); *B29C 33/3828* (2013.01); *B29C 2033/385* (2013.01); *B29C 33/02* (2013.01); *B23P 15/007* (2013.01); *B29C 45/37* (2013.01); *B29C 45/73* (2013.01); *B29C 2033/023* (2013.01)
USPC ............ 264/219; 156/256; 156/257; 156/258

(58) Field of Classification Search
CPC ............ B29C 33/3828; B29C 33/3842; B29C 2033/023; B29C 2033/3842; B29C 2033/385; B29C 33/02

USPC ........... 264/219; 249/111; 156/153, 258, 256, 156/257; 425/175, 179
See application file for complete search history.

(56) References Cited

U.S. PATENT DOCUMENTS 3,734,449 A * 5/1973 Itou et al. ................... 249/114.1
4,225,109 A * 9/1980 Yotsutsuji et al. ............ 249/111
(Continued)

FOREIGN PATENT DOCUMENTS

GB 2172240 A 9/1986
JP 05-245881 * 9/1993 .............. B29C 45/00
(Continued)

OTHER PUBLICATIONS

English Translation of International Preliminary Report on Patentability Chapter I, PCT/JP2007/059396, Nov. 17, 2008, pp. 6.

*Primary Examiner* — Atul P. Khare
(74) *Attorney, Agent, or Firm* — Ogilvie Law Firm (57) ABSTRACT

A process for producing a heat-insulating cavity mold, characterized by producing two members, i.e., a metallic surface layer member (1) for forming a metallic surface layer (5) of a cavity mold in a mold for thermoplastic resin molding and a cavity mold main body member (9) for forming the cavity mold, forming a heat-insulating layer (10') on a bonding surface of the member (9), bonding the two members to each other, and subsequently eliminating an unnecessary part (3, 12) of the metallic surface layer member to form the metallic surface layer (5); a heat-insulating cavity mold; and a mold for thermoplastic resin molding which employs the cavity mold. The mold for thermoplastic resin molding is characterized by being a heat-insulating mold comprising: the heat-insulating cavity mold produced by the production technique from a metallic surface layer member made of a metal having low thermal conductivity and a cavity mold main body member made of a metal having high thermal conductivity; and a core mold produced from an SUS steel material for molds.

12 Claims, 7 Drawing Sheets

(a)

(b)

(56) References Cited

U.S. PATENT DOCUMENTS

| | | | |
|---|---|---|---|
| 4,285,901 A * | 8/1981 | Yotsutsuji et al. | 264/225 |
| 4,983,247 A * | 1/1991 | Kim | 156/272.2 |
| 5,064,597 A * | 11/1991 | Kim | 264/219 |
| 5,124,192 A * | 6/1992 | Kim et al. | 428/215 |
| 5,176,839 A * | 1/1993 | Kim | 249/78 |
| 5,388,803 A * | 2/1995 | Baumgartner et al. | 249/111 |
| 5,468,141 A * | 11/1995 | Iwami et al. | 425/542 |
| 5,489,410 A * | 2/1996 | Baumgartner et al. | 264/219 |
| 5,535,980 A * | 7/1996 | Baumgartner et al. | 249/114.1 |
| 5,653,932 A * | 8/1997 | Aida et al. | 264/219 |
| 5,866,025 A * | 2/1999 | Kataoka et al. | 249/114.1 |
| 2004/0038049 A1 * | 2/2004 | Suzuki et al. | 428/457 |
| 2005/0139475 A1 | 6/2005 | Furuya et al. | |

FOREIGN PATENT DOCUMENTS

| | | | |
|---|---|---|---|
| JP | 8-25428 A | | 1/1996 |
| JP | 9-262838 A | | 10/1997 |
| JP | 09262838 A | * | 10/1997 |
| JP | 2002-96335 A | | 4/2002 |
| JP | 2002-172655 A | | 6/2002 |
| JP | 2003-011131 A | | 1/2003 |
| JP | 2005-095919 A | | 4/2005 |

* cited by examiner

Prior Art

Fig.9

Prior Art

MOLD FOR THERMOPLASTIC RESIN MOLDING, CAVITY MOLD, AND PROCESS FOR PRODUCING THE CAVITY MOLD

RELATED APPLICATIONS

To the fullest extent possible, the present application claims priority to, and incorporates by reference, PCT/JP2007/059396 filed May 2, 2007 and JP2006-154037 filed May 2, 2006.

TECHNICAL FIELD

The present invention relates to a cavity mold to be used in a mold for thermoplastic injection molding for injection-molding a thermoplastic resin.

A cavity mold of the present invention relates to a thermoplastic resin molding heat-insulating mold which faithfully transfers its surface luster and fine uneven patterns onto a molding surface, and molds a beautiful molding in which an internal stress and distortion are minimized, and which has no sink marks on the surface, at a low pressure or an extremely low pressure.

In detail, in molding of a thin molding having a partial thick portion such as a rib or boss on its back surface, or a high-viscosity resin molding, the present invention relates to a practicable thermoplastic resin molding heat-insulating mold, a heat-insulating cavity mold, and a method for producing the heat-insulating cavity mold by which a molding having a beautiful appearance including no sink marks is molded at a low pressure.

Herein, "sink" is a dent formed on the surface of a molding due to cooling and shrinkage of the filled resin.

BACKGROUND ART

First, concerning the mold for thermoplastic injection molding and the cavity mold relating to the present invention, examples of the conventional techniques will be described below.

Figure 8:
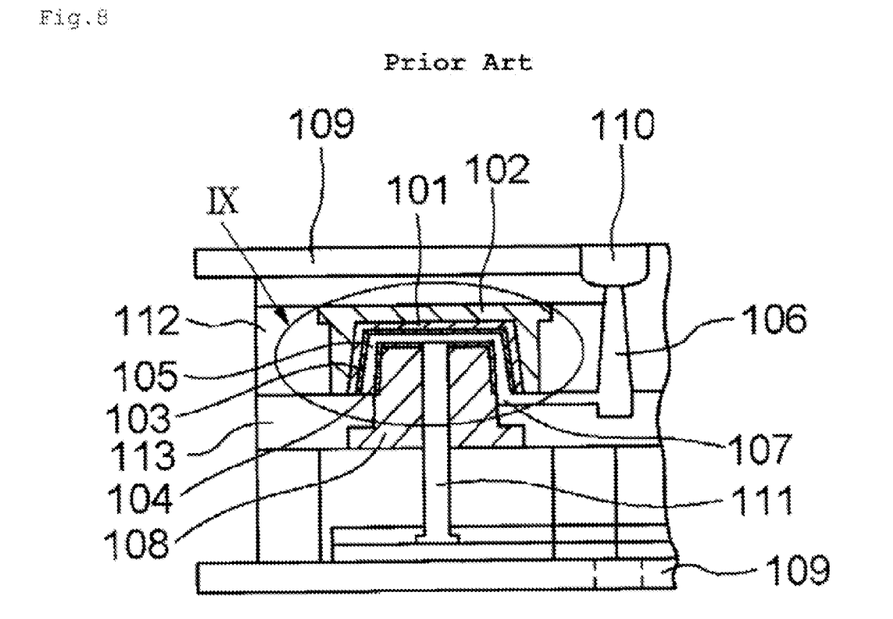
FIG. 8 is a sectional view of a mold for injection molding according to the conventional technique.
Figure 9:
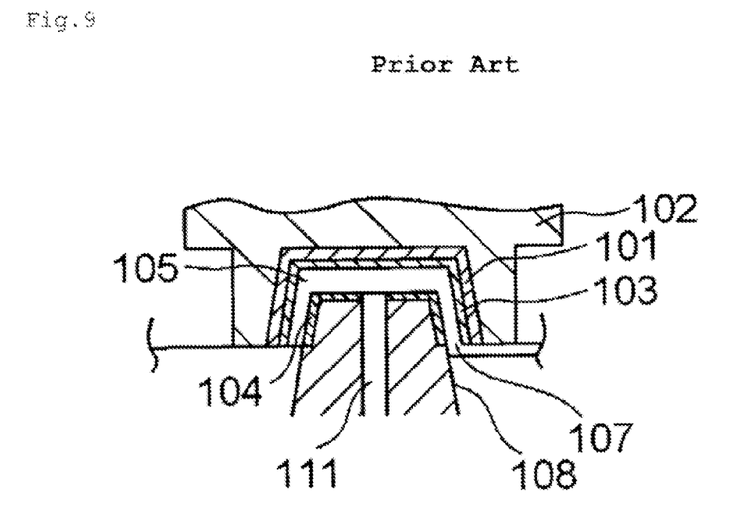
FIG. 9 is an enlarged sectional view of the mold for injection molding according to the conventional technique.

FIG. 8 is a schematic sectional view of a mold for injection-molding including a concave cavity mold 102 and a convex core mold 108. FIG. 9 is an enlarged view of the part IX of FIG. 8. In this cavity mold, a thin metallic layer 103 is formed on the surface of a heat-insulating layer 101 made of heat-resistant plastic.

This cavity mold 102 is manufactured as follows.

First, a mother die which has the same outside dimensions as those of the cavity part (cavity) 105, that is, the molding shape is formed, and on its surface, a thin metallic layer 103 is formed by electroforming, injected and fixed into a cavity mold member via heat-resistant plastic, and molding a heat-insulating layer 101 at the same time, and then the mother die is removed, whereby the cavity mold 102 is manufactured.

On the surface of a core mold 108, a mold release heat-insulating layer 104 made of fluorine resin-dispersed nickel plating is formed.

The heat insulating layer 101 and the thin metallic layer 103 are joined to the cavity mold by an adhesive, etc., to form the surface of the cavity mold 102.

A molten resin from an injection molding machine passes through a spool 106 and a gate 107 from a nozzle touch portion 110 and is then filled in the cavity part (cavity) 105 formed between the cavity mold 102 and the core mold 108.

In the figures, the reference numeral 109 denotes an attaching plate, 111 denotes a projecting pin, 112 denotes a cavity plate, and 113 denotes a core plate.

Normally, a mold for injection molding is made of a metallic material, and when a resin is filled in the mold and comes into contact with the mold surface, this filling progresses while a solidified layer is formed on the resin surface, and after completion of the filling, a predetermined pressure is applied, however, not only does the formed solidified layer hinder transfer of the mold surface, but also a turbulence and an irregular flow are frozen on the solidified layer and causes a weld and a flow mark in many cases.

Herein, "weld" means a stripe pattern occurring at a junction of molten resin flows inside the mold, and "flow mark" means a pattern like a ripple formed on the surface of a molding due to resin flows.

To solve the above-described problem, an injection molding heat-insulating mold (abbreviated to heat-insulating mold or heat-insulating die) is devised. The heat-insulating cavity mold is structured so that on the surface of a normal cavity mold, a heat-insulating layer is formed, and on the surface thereof, a thin metallic layer is further formed so as to make the heat capacity of the mold surface small.

When a resin is filled in the heat-insulating mold, the cavity surface is instantaneously raised in temperature due to the quantity of heat of the resin, and thereafter, the heat is quickly released and the temperature is lowered, so that the appearance is improved without losing productivity, and the problem of a normal mold is reduced or solved.

Some methods for producing the heat-insulating cavity mold have been proposed, and according to one method, a metallic layer of 0.1 to 0.5 mm is formed by electroforming nickel on a mother die having the same shape as a molding shape by using an electroforming method, and on the surface thereof, a heat-insulating layer is provided and a backing block is further backed and integrated, and then the mother die is removed, whereby a heat-insulating cavity mold is produced (Patent document 4).

There is another method in which a heat-insulating layer is formed by resin coating, etc., on the surface of a cavity mold made of a normal steel material, and thereon, electroless plating is further formed (Patent document 1).

According to the former electroforming method, a thin metallic surface layer is formed on a mother die first, and a heat-insulating layer is provided thereon, and the latter method is a pile-up method in which a heat-insulating layer is formed on the mold surface first, and a metallic layer is provided thereon, and the steps are reversed.

A heat-insulating mold is proposed which includes a heat-insulating cavity mold formed by the above-described electroforming and a core mold coated with a mold release heat-insulating coating (Patent document 3), and hereinafter, a heat-insulating mold formed by a conventional method or electroforming means an injection molding heat-insulating mold based on this Patent document 3.

Patent document 1: Japanese Published Unexamined Patent Application No. H07-137040
Patent document 2: Japanese Published Unexamined Patent Application No. 2002-172655
Patent document 3: Japanese Published Unexamined Patent Application No. H06-218769
Patent document 4: Japanese Published Unexamined Patent Application No. S55-55818
Non-patent document 1: "Development of accurate transfer and sink preventive low-pressure molding system by melt movement control when cooling-melt moving molding method," Japan Society of Polymer Processing 2000, Lecture meeting collected papers A207 from 11th Workshop, pp. 47

Non-patent document 2: "Measurement of heat-insulating mold surface-melt adhesion influencing melt movement," Meeting of Japan Society of Polymer Processing 2004, Lecture meeting collected papers VI-205 from 15th annual meeting, pp. 309

DISCLOSURE OF THE INVENTION

Problems to be Solved by the Invention

From the results of an abundance of practical data from production over a long period of time of mass-produced molds or trial molds, etc., it was clearly found that these still had two or three fundamental problems in practical use.

Judging from these experiments and practical data, a general-purpose practicable mold which is required to have stability in use over a long period of time cannot be realized by the latter method in which only a resin-based heat-insulating layer is formed on the mold surface or the heat-insulating mold which has a metallic layer formed on the surface by electroless plating, etc.

The two or three problems which hinder practical use of a conventional heat-insulating mold are classified as a mechanical aspect and a functional aspect.

First, in the mechanical aspect, under repetition conditions of injection molding at a high pressure and high temperature, the metallic surface layer has a lack of stability. In detail,
(1) Exfoliation easily occurs between the metallic surface layer and the heat-insulating layer during a long period of time of production of moldings,
(2) The metallic surface layer formed by nickel electroforming has great thickness variation, and with respect to a thickness requirement of 0.15 mm, some portions of the concave portion may be half in thickness, so that these are physically fragile,
(3) The electroformed nickel layer generally has a high internal stress, and it easily varies, so that distortion, deformation, and breakage easily occur,
(4) The electroformed nickel layer is soft (Vickers hardness HV: about 230), and the cavity surface is easily damaged;
(5) The method is complicated and the mold manufacturing period is long.

The reason for (1) is that the heat expansion difference between the metallic layer and the heat-insulating layer is great, and the adhesive strength of the interface thereof is weak in comparison with a great stress occurring at the interface. Particularly, at the gate, a shearing stress when filling a resin is also applied, so that the tendency of exfoliation of the nickel layer is great.

The major reason for the weak adhesive strength between these layers is that, in the case of electroforming, the nickel layer formed on a mother die is thin and soft, so that the nickel layer surface which is joined to the heat-insulating layer cannot be roughened by sandblasting for adhesion. Therefore, roughening by high-current plating is also possible, however, in the case of the cavity mold, a high current cannot be uniformly obtained in terms of the shape, and this is not preferable.

In the case of the latter method for the heat-insulating cavity mold, that is, the pile-up method in which a heat-insulating layer is formed on the mold surface, and a metallic layer is further formed thereon by electroless plating, etc., the heat-insulating layer surface of the adhesion interface is roughened, so that an effective anchor effect cannot be obtained, and a peeling adhesive force in this case is not more than about 1 kgf/cm, and this is not practicable. Concerning the nickel hardness of the above-described (4), a higher hardness can be realized by alloying Ni—Co, etc., however, the stress of plating is also increased, so that it is difficult to apply this to a heat-insulating mold obtained by electroforming.

However, at present, for forming the metallic surface layer of the heat-insulating cavity mold, there is no appropriate method other than the electroforming method, and as a result, various problems occur during mold manufacturing or during molding, and the method is complicated and the production period is long, and these are the first reasons why the heat-insulating mold has not been made practicable although it has been expected in the injection molding industry.

Next, in the functional aspect, in the case of a heat-insulating mold according to the conventional method in which a heat-insulating cavity mold manufactured by nickel electroforming and a core mold having a mold release heat-insulating layer formed on the surface by fluorine resin-dispersed nickel plating, etc., are incorporated, excellent results are obtained in view of transfer performance and weld. However, sink marks due to cooling shrinkage easily occur on the surface of a boss and a rib formed on the back surface of a molding. Of course, this is not solved in a normal mold made of a steel material.

The functional aspect of the heat-insulating mold will be described in more detail.

When a resin is filled in the mold, the cavity surface is instantaneously raised in temperature, however, influence of the highest temperature on a molding changes when reaching Tg of the resin (glass transition temperature of the thermoplastic resin).

When the highest temperature is not more than Tg, this results in improvement in only the appearance quality such as improvement in transfer performance due to an effect of delaying solidified layer occurrence and weld reduction, however, when it is not less than Tg, this brings about non-conventional two new concepts.

First is a function or concept of "wet adhesion" occurring between the molten resin and the cavity mold surface in which a resin interface in contact with the mold surface maintains liquid.

Second is a function of producing a phenomenon in which high-temperature core-side melt moves to the cavity side which was cooled earlier, and the surface of a molding is a result of transfer, and sink marks occur on the back surface (hereinafter, abbreviated to "surface transfer" phenomenon), that is, a concept of compensating for cooling shrinkage of the cavity side resin by this melt movement.

Concept conversion from the conventional "high-pressure transfer by pressure" to "wet transfer by wet adhesion" and concept conversion from the conventional "shrinkage compensation by pressure keeping" to "surface shrinkage compensation by melt movement" occur inevitably.

As a result, the following various functions, etc., which cannot be realized by the conventional techniques are obtained:
(1) low-pressure fine transfer
(2) solution to problems such as weld, flow mark, and jetting, etc.
(3) the cavity surface is transferred at a low pressure, and sink marks are concentrated at the core-side surface (that is, back surface) (called "surface transfer" function or "sink prevention" function)

Herein, "jetting" is a phenomenon in which molten resin jets out from the gate (107 of FIG. 8) when it enters the inside of the cavity.

The above-described "surface transfer" phenomenon occurs according to the following mechanism.

When a resin is filled at a low pressure inside a mold formed by applying a mold release heat-insulating coating on the surface of the core mold of the heat-insulating mold, the cavity surface is instantaneously raised in temperature, and the resin gets wet and adheres to the cavity surface.

Due to shrinkage which occurs concurrently with the filling, the resin is drawn to the cavity side, and released from the core mold surface (released from adhesion or close contact state, and an air laminar film is formed at the interface), and an air laminar film is formed between the resin and the mold surface.

As a result, on the core side of the resin, cooling slows down, and the high temperature is maintained.

Heat radiation and cooling of the cavity side resin progresses while it adheres to the mold surface, and a temperature difference between the resin surface and back surface becomes a driving force and the high-temperature resin on the core side moves to the low-temperature cavity side and compensates for the cooling shrinkage of the cavity side. As a result, on the cavity-side surface of the resin, sink marks do not occur, and sink marks caused by shrinkage are concentrated at the core side (that is, the back surface of a molding).

However, this "surface transfer" function is not always excellent, and in comparison with a sink preventive effect on a parallel thick portion surface, in particular, it is difficult to prevent sink marks on the rib or boss corresponding surface on the back surface. The "mold release heat-insulating coating film" applied for assisting this "surface transfer" function has practical problems such as wearing of the surface which occurs during production of moldings over a long period of time and deteriorates the function, etc.

This is the second reason which hinders practical use of a conventional heat-insulating mold.

The reason why it is difficult to prevent sink marks on the rib or boss corresponding surface in comparison with a parallel thick portion is judged that the resin of the rib or boss formed on the core surface has a wider radiation area than that of the parallel portion, so that they are more quickly cooled, and compensation is made for shrinkage thereof by the high-temperature resin of the cavity side, and sink marks occur on the cavity-side surface. In other words, this is an inversion phenomenon of the original "surface transfer" phenomenon.

Therefore, to effectively perform the sink preventive function (or "surface transfer" function), along with strengthening of resin adhesion onto the cavity surface, it is important to accelerate the cooling of the cavity-side resin, urge early mold release on the core mold surface, maintain the core-side resin at a high temperature, and lower the mold internal pressure and improve the melt mobility.

However, if the mold temperature is lowered to accelerate cooling on the cavity side or a high-heat-conductivity steel material is used for the cavity main body, when filling the resin, temperature rise on the cavity mold surface slows down, and resin adhesion weakens, and mold release from the cavity mold surface becomes conversely faster, and sink marks easily occur on the cavity-side surface.

The "surface transfer" phenomenon is described in Non-patent document 1.

As a method for solving the problem of sink marks on a rib provided on the core side, a method is proposed in which a core piece which is provided with a concave portion for a rib and has a heating means is fitted, a gas is supplied into the concave portion inside through the core piece, and the core side resin is forcibly released from the mold and pressed against the cavity side (Patent document 2).

The present invention proposes a method for producing a heat-insulating cavity mold by milling or discharge machining, etc., instead of electroforming to solve various problems posed by electroforming, and provides a functional heat-insulating system mold which can solve the occurrence of sink marks by a synergetic effect generated by reinforcing constituent elements of the "surface transfer" function without using an assisting means from the outside as described above.

OBJECTS OF THE INVENTION

An object of the present invention is to improve structural durability of a heat-insulating mold formed according to a conventional method and improve the sink preventive function, and in detail, the object consists of the following four objects:

First, to provide a new method for manufacturing a heat-insulating cavity mold.

Second, to provide a heat-insulating cavity mold which can show stable durability over a long period of use of the mold and has a strengthened "surface transfer" function.

Third, to provide a mold for thermoplastic injection molding in which, when a resin filled in the mold shrinks due to cooling, it releases from the core mold surface "earlier and more reliably" than from the cavity mold surface.

Fourth, to provide a method for molding a molding having a beautiful appearance which has no sink marks on the surface of the molding on which the cavity mold surface is faithfully transferred, and has cooling shrinkage concentrated at the back surface of the molding, and provide the molding.

Means to Solve the Objects

The first object of the present invention is achieved by a method for producing a heat-insulating cavity mold wherein, when joining two members of a metallic surface layer member for forming a metallic surface layer and a cavity main body member for forming a cavity main body, heat-insulating layers are formed on joined surfaces of the members, and after the members are joined, an unnecessary portion of the metallic surface layer member is eliminated by milling or discharge machining, etc., to form a cavity mold thin metallic surface layer.

Further, the first object is achieved by the method for producing a heat-insulating cavity mold of the present invention including the steps of:

(1) making both of a metallic surface layer member for forming a cavity mold metallic surface layer and a cavity main body member for forming a cavity main body;

(2) making a shape having an offset of the thickness of the metallic surface layer from the cavity mold surface shape (molding shaped surface+PL surface) on the end face of the metallic surface layer member, and on the outermost periphery of the end face, making a fitting surface by machining centering location outer walls of the members;

(3) making a concaved fitting surface which is an inversion of the fitting surface of the surface metallic member and has a uniform concave portion for forming a heat-insulating layer at the molding shaped portion, on an end face of the cavity main body member;

(4) roughening both fitting surfaces by sandblasting or discharge machining;

(5) forming a heat-insulating layer in the concave portion for forming a heat insulating layer;

(6) joining and integrating the fitting surfaces by an adhesive; and (7) eliminating an unnecessary portion from the metallic surface layer member by milling or discharge machining, etc., after integrating to form a thin metallic surface layer.

Herein, the PL surface is a butting surface of molds, that is, a parting surface.

The centering location is a fitting portion provided for improving attaching accuracy of the two machine parts, and without limiting to the method in which centering location outer walls are provided as in this example, various methods can be used such as provision of a pin and a corresponding fitting hole.

Sandblasting is a method in which sand or a granular abrasive is sprayed on a workpiece by compressed air or centrifugal force. This is one of methods for increasing the adhesion of coating by the anchor effect (a liquid adhesive enters pores and valleys of the material surface and solidifies there) by roughening the surface of a molding.

The second object is achieved by making the metallic surface layer member of a general mold steel material (for example, NAC80 with heat conductivity of 0.1 cal/cal/cm·sec·° C., made by Daido Steel Co., Ltd.). More preferably, (1) the metallic surface layer member is made of a stainless steel alloy, a titanium alloy, or a steel material with heat conductivity not more than about 0.05 cal/cm·sec·° C. (heat conductivity of the stainless steel alloy),
(2) the whole or a part of the cavity main body member is made of an aluminum alloy, copper, a copper alloy, or a steel material with heat conductivity not less than 0.30 cal/cm·sec·° C. (heat conductivity of aluminum alloys of JIS A7000 series), and
(3) the heat insulating layer is made of one kind of material of ceramics, glass, or a heat-resistant resin and heat-resistant resin composite material, and the metallic surface layer has a thickness of 0.1 to 0.5 mm, and the heat-insulating layer has a thickness of 0.2 to 2.0 mm.

Further, the second object of the present invention is more stably achieved by a heat-insulating cavity mold of the present invention which has a thin-film surface layer with good wettability with molten resin on the metallic surface layer.

The third object, that is, to provide an injection molding heat-insulating mold in which, when a resin filled therein is cooled, the resin is released from the core mold surface earlier than from the heat-insulating cavity mold surface, is achieved by an injection molding heat-insulating mold of the present invention which includes the heat-insulating cavity mold of the present invention and a core mold made of a general mold steel material.

The third object is achieved more stably by an injection molding heat-insulating mold of the present invention which is an injection molding heat-insulating mold including the heat-insulating cavity mold of the present invention and a core mold, in which the core mold or a part of it is made of one kind of material of stainless steel, a stainless steel alloy, titanium, a titanium alloy, a mold release heat-insulating resin composite material, or a metal with heat conductivity not more than 0.055 cal/cm·sec·° C. (heat conductivity of the stainless steel alloy), or other mold materials.

The fourth object, that is, to provide a molding which has a beautiful appearance with no sink marks on a rib corresponding surfaces, and has cooling shrinkage concentrated at the back surface, is achieved by molding resin by selecting appropriate low-pressure molding conditions and using the injection molding heat-insulating mold of the present invention including the heat-insulating cavity mold of the present invention and a core mold, and achieved more stably by using a low heat-conductivity metal such as a stainless steel alloy for the core mold.

Effects of the Invention

The present invention was developed instead of the method for producing a heat-insulating cavity mold using electroforming, in which members of a metallic surface layer member for forming a metallic cavity surface layer and a cavity main body member for forming a cavity main body are manufactured, and on end faces thereof, fitting surfaces are formed.

Further, both fitting surfaces are joined by forming a heat-insulating layer between the fitting surfaces roughened by sandblasting. Thereafter, by eliminating an unnecessary portion of the metallic surface layer member by milling or discharge machining, etc., a metallic surface layer is formed.

In other words,
(A) the new method in which two members are joined (the cause of the effect (1) described later) enables:
(B) making the metallic surface layer (thickness: 0.10 to 0.5 mm) of a mold steel material with low heat conductivity (the cause of the effects (2), (3), and (4) described later); and
(C) making the cavity main body member of a high-heat conductivity steel material (the cause of the effect (5) described later).

By using a molding heat-insulating mold including the heat-insulating cavity mold of the present invention made by using the steel materials (B) and (C) and a core mold made of a general mold steel material, the following effects are obtained in comparison with a heat-insulating mold manufactured according to the conventional method (including a heat-insulating cavity mold formed by nickel electroforming and a core mold whose surface is coated with a mold release heat-insulating coating).

Effect (1) In the electroforming method, the nickel surface which adhered onto the heat-insulating layer could not be sufficiently roughened, so that shortage of adhesive strength came into question, however, in the new method, strong roughening was possible for roughening the metallic block surface, so that the adhesive strength was increased about four to five times as strong as in the conventional electroforming method, and a mold surface which could be stably used over a long period of time could be formed (refer to "peeling adhesive strength measurement experiment" described later).

Effect (2) The thickness of the metallic surface layer has variation of ±30% or more in the conventional electroforming method, however, in the new method, it was machined by milling or discharge machining, so that the accuracy was improved to ±5% or less. Further, a general mold steel material had lower heat conductivity than that of nickel and had excellent wettability with molten resin, so that the strength and the temperature behavior of the cavity surface became stable, and great improvement was obtained in both of the mechanical aspect and the functional aspect.

Effect (3) The hardness of the metallic surface layer formed by nickel electroforming was about 230 (HRC18) Hv, and it had problems in deformation and abrasion resistance, however, in the method of the present invention, a stainless steel alloy or a titanium alloy (both have a hardness of 300 to 330 (HRC30-35) Hv) as a mold steel material could be used for the metallic cavity surface layer, so that the mold could be used stably like a normal mold.

Effect (4) By forming the metallic surface layer with low heat conductivity, the mold surface temperature when a resin is filled was raised higher, and adhesion between the filled resin and the mold surface increased, and the sink preventive function increased (refer to "approximate calculation formula of interface temperature when two different objects come into contact with each other" described later, FIG. 3 and FIG. 4 of Non-patent document 2).

In the conventional method, the adhesion between the nickel layer on the mold surface and the filled resin is weak, so that the cooling rate of the cavity side cannot be increased. In other words, the rising peak temperature of the nickel surface layer is low, it is required that the adhesion with the filled resin is increased by keeping the peak temperature by slow cooling, however, the method of the present invention increased the adhesion, so that the radiation rate could be increased by using a high-heat conductivity steel material for the cavity main body member.

Effect (5) The cooling rate of the cavity mold-side surface of the filled resin was increased, the mold release temperature on the cavity mold surface is lowered, and the temperature difference between the cavity mold surface and the core mold surface was increased, and as a result, early mold release occurs on the core mold surface, the melt mobility was increased, and the sink preventive function was strengthened (refer to the description of FIG. 3 of No-patent document 2).

In an injection molding heat-insulating mold including the heat-insulating cavity mold of the present invention and a core mold made of a general mold steel material, by making the core mold of a low-heat conductivity metal such as a stainless-steel-based metal, radiation slowed down when the filled resin came into contact with the core mold surface and the high-temperature maintaining performance and mobility of the core side resin were increased, mold release was made earlier, and the sink preventive function was improved.

By forming a thin film of a metal oxide, etc., with excellent wettability with water such as silicon dioxide on the metallic surface layer of the injection molding heat-insulating mold of the present invention, a series of synergetic effects are obtained such that wettability with the resin was increased, adhesion between the metallic surface layer and the resin was increased, and the mold release temperature on the cavity surface could be lowered, and the sink preventive effect was strengthened, and the range of conditions for molding a non-defective was widened.

By molding by using the injection molding heat-insulating mold including the heat-insulating cavity mold formed according to the new method constituting a means for achieving the second object of the present invention, and a core block, a molding of the present invention having an appearance which includes no sink marks, etc., on a rib corresponding surface and beautifully transfers the mold surface, and has sink marks concentrated at the core side (that is, the back side of the molding), is molded.

(Peeling Adhesive Strength Measurement Experiment)

As for having the closest relationship with regard to reliability of a mold, that is the peeling adhesive strength between the heat-insulating layer and the metallic surface layer. In the present invention, the peeling adhesive strength was investigated according to the following method.

Three blocks of 5 cm-square×1 cm (thickness) were made of each of a general mold steel (trade name: NAC80) and a stainless steel alloy steel (trade name: NAC101), and three heat-insulating plates (5 cm-square×1 cm (thickness)) were made of a silica powder-filled heat-insulating epoxy-based composite resin.

Both metal block surfaces were roughened by blasting at a pressure of 7 kgf/cm$^2$ with #30 Morundum grindstone, and coated with an epoxy-based heat-resistant adhesive, and pressure-welded to each other by sandwiching the heat-insulating plate therebetween, and adhesive-joined by heating.

After adhesive-joining, a thin layer of 0.15 mm was left on the joined surfaces of the stainless steel alloy blocks, and the unnecessary remaining portions were cut and eliminated, and further, a 1 cm-width band-like cut was made in these thin metal layers, and accordingly, measuring samples of three bands were manufactured.

The band-like thin metal layer end portions were pulled vertically by a push-pull gauge, and the peeling adhesive strengths between the heat-insulating plates and the thin metal layers were measured.

The average strength of the three bands was 6.3 kgf/cm. The average of peeling adhesive strengths of samples which were roughened by blasting at a pressure of 1 kgf/cm$^2$ with #120 grindstone in the same manner was 1.3 kgf/cm. The adhesive strength measured in the same manner when both block surfaces were roughly discharge-machined was 4.8 kgf/cm.

When objects with different temperatures come into contact with each other, the interface temperature Ts at this moment relates to the temperature levels and thermal properties of the two objects, and is calculated approximately according to the following formula (1).

$$Ts=(brTr+bmTm)/(br/bm) \quad (1)$$

Here, $b=\sqrt{\rho c \lambda}$ $\rho$: density, c: specific heat, $\lambda$; heat conductivity, Tr: resin temperature, Tm: mold surface temperature, and the suffixes r and m mean resin and mold.

In this case, bm is a value one larger digit or more than br, so that the interface temperature (resin surface temperature) at the moment at which the resin and mold come into contact is greatly influenced by the temperature of the mold metallic surface layer and $\rho c \lambda$, and it is shown that the higher the temperature or the smaller the $\rho c \lambda$, the higher the interface temperature.

This means that, by selecting a low-conductivity material for the metallic surface layer member, the mold surface temperature when the resin is filled rises higher.

Referring to "Relationship between resin temperature and adhesion on cavity surface" of FIG. 4 of Non-patent document 2, when the resin is filled, the adhesion between the mold surface raised in temperature to 90° C. and the melt is 550 gf/cm$^2$, and when the temperature is raised to 100° C., the adhesion is 650 gf/cm$^2$, and when the mold surface temperature rises by 10° C. from 90° C., the adhesion increases by 18%.

Referring to "Change with time of cavity surface temperature after melt adheres" of FIG. 3 of Non-patent document 2, as the cavity block temperature lowers to 80° C., 70° C., 60° C., and 50° C., the mold release temperature lowers to 83° C., 79° C., 75° C., and 71° C., respectively.

Setting the cavity mold temperature to be low means an increase in cooling rate of the filled resin, and in other words, by selecting a high-heat conductivity material for the cavity main body member, the mold release temperature on the cavity surface lowers, early mold release on the core mold surface is promoted, the melt mobility is improved, and formation of a resin surface rigid layer at the time of release from the cavity mold surface is further promoted, and the cavity surface is hardly deformed by cooling shrinkage occurring later.

Eventually, to strengthen the surface sink preventive function ("surface transfer" function) of a molding, (1) the cavity surface rising temperature is set to be higher when molten resin is filled to increase the adhesion between the cavity mold surface and the molten resin, and for this, a metallic surface layer member with the lowest possible heat conductivity is preferably used, (2) by lowering the mold release temperature by increasing the cooling rate of the cavity side resin, the temperature difference from the core side resin is increased, and for this, a cavity main body member with the highest possible heat conductivity is preferably used, (3) high melt mobility is maintained by slowing-down the resin cooling of the core side, and for this, a material with the lowest possible heat conductivity is preferably selected for the core mold, and further (4) the melt mobility is preferably improved by setting molding conditions of a high speed, a low pressure, and a short time.

Based on the above-described knowledge, a heat-insulating mold formed according to the conventional method and a heat-insulating mold 1 (including the heat-insulating cavity mold of the present invention and a core mold made of a general mold steel material) and a heat-insulating mold 2 (including the heat-insulating cavity mold of the present invention and a core mold made of stainless steel alloy steel) were manufactured, and sink preventive functions of these were compared.

First, a nickel layer with a thickness of 0.15 mm was formed by electroforming on a master formed by polishing the surface of a square block, and on the surface thereof, a heat-insulating layer with a thickness of 1 mm was formed of an epoxy-based heat-insulating composite resin, and a backing block of an iron material was further backed and bonded thereon. Thereafter, the master was removed to manufacture a heat-insulating cavity mold of 100 (longitudinal)×80 (lateral)×20 (thickness) mm according to the conventional method.

Further, an iron core mold block of 100×80×30 (thickness) mm was prepared, and by making an engraving of 80 (longitudinal)×60 (lateral)×1.5 (thickness) mm of a plate molding cavity on the surface and making three engravings different in depth from each other of 1.5 (depth)×40 (lateral)×10 (longitudinal) mm, 2×40×10 mm, and 3×40×10 mm on the bottom surface, a core mold was manufactured, and on the surface thereof, mold release heat-insulating coating was formed by fluorine-dispersed electroless nickel plating, whereby the core mold according to the conventional method was manufactured.

On the other hand, the heat-insulating cavity mold of the present invention was manufactured as follows.

A metallic surface layer member of 100 (longitudinal)×80 (lateral)×20 (thickness) mm of a mold stainless steel alloy steel (trade name: NAC-101) and a cavity main body member of 100 (longitudinal)×80 (lateral)×30 (thickness) mm of a beryllium copper alloy (BeA-25) were manufactured.

Further, a heat-insulating layer forming concave portion of 90 (longitudinal)×70 (lateral)×1.0 (depth) mm was machined on a wide end face of the cavity main body member, an epoxy-based heat-resistant composite resin was filled and cured in the concave portion and finished into a uniform heat-insulating layer to form a fitting surface.

Thereafter, end faces of both members were roughened, and then an adhesive was applied thereto, and the fitting surfaces were fitted and joined by pressuring and heating.

After joining both members, a thickness of 0.15 mm of the metallic surface layer member from the fitting surface was left, and the remaining unnecessary portion (3)12 was eliminated to form a flat thin metallic surface layer, and the layer was polished into a mirror surface, whereby the heat-insulating cavity mold of the present invention was manufactured.

On the other hand, a standard mold base having a side gate two-plate structure was manufactured, and two sets of pockets to which the cavity mold and the core mold are attached in pairs are machined at bilaterally symmetric positions of the cavity and the core plate of the mold base. In one set of pockets, the heat-insulating cavity mold according to the conventional method and the core mold were incorporated in pairs, and other necessary processes were applied to manufacture the heat-insulating mold according to the conventional method.

In the other-side pockets, the heat-insulating cavity mold of the present invention and an iron-made core mold which had the same shape as that in the conventional method and had no mold release heat-insulating coating were incorporated in pairs, and the same necessary processes were applied to manufacture the heat-insulating mold 1 of the present invention.

In the heat-insulating mold 2 of the present invention, instead of the iron core mold of the heat-insulating mold 1, a core mold having the same shape made of stainless steel alloy steel was set.

By using these three heat-insulating molds, an ABS molding material was molded under conditions of a resin temperature of 230° C., a mold temperature of 80° C., a primary pressure of 400 kg/cm$^2$, an injection rate of 200 cc/sec, an injection time of 3 sec, and a constant speed and a constant pressure, and sink preventive effects of the object functional molds were compared based on specific surface sink valuation standards. The heat-insulating mold constitutions and molding results are shown in Table 1.

TABLE 1

| Names of various heat-insulating molds, and their constitutions and sink preventive effects | | | | | | | |
|---|---|---|---|---|---|---|---|
| Heat-insulating mold constitution | Cavity mold constituent material | | Heat-insulating | | Valuation of sink marks on rib | | |
| Name of heat-insulating mold | Metallic surface layer | Cavity main body | layer thickness (mm) | Core mold constitution | surface Rib thickness | | |
| | | | | | 1.5 mm | 2 mm | 3 mm |
| Conventional heat-insulating mold (Electroforming) | Nickel | Iron | 1.0 | Iron core + surface mold release heat-insulating coating | Δ | x | x |

TABLE 1-continued

Names of various heat-insulating molds, and their constitutions and sink preventive effects

| Heat-insulating mold constitution | Cavity mold constituent material | | Heat-insulating | | Valuation of sink marks on rib | | |
|---|---|---|---|---|---|---|---|
| Name of heat-insulating mold | Metallic surface layer | Cavity main body | layer thickness (mm) | Core mold constitution | surface Rib thickness | | |
| | | | | | 1.5 mm | 2 mm | 3 mm |
| Heat-insulating mold 1 of the present invention | Stainless steel alloy | Aluminum alloy | 1.0 | Iron | ○ | ○ | Δ |
| Heat-insulating mold 2 of the present invention | Stainless steel alloy | Aluminum alloy | 1.0 | Stainless steel alloy | ○ | ○ | ○ |

Circle: No sink marks on rib surface
Triangle: Slight sink marks on rib surface
Cross: Sink marks on rib surface From Table 1, in this experiment, in the case of the heat-insulating mold according to the conventional method, mold release heat-insulating coating on the core mold for realizing early mold release on the core mold surface is still insufficient (Patent document 3).

However, in the case of the heat-insulating molds of the present invention, this coating is not applied, so that even when the core is made of only iron, the adhesion of the filled resin onto the cavity surface is improved and cooling of the cavity side resin is promoted, so that a surface sink preventive effect greater than in the conventional heat-insulating mold is obtained, and further, by the synergetic effect of the combination with the cooling slow-down effect of the stainless steel alloy steel core mold with low heat conductivity, the sink preventive effect is further promoted.

The injection molding heat-insulating molds of the present invention are high-performance system heat-insulating molds which have strengthened sink preventive element functions and are realized by the synergetic effect, and solve all practical problems in mechanisms and functions of heat-insulating molds formed according to the conventional method.

BEST MODE FOR CARRYING OUT THE INVENTION

First Embodiment

Hereinafter, a first embodiment of the present invention will be described in detail based on the accompanying drawings.

Figure 1:
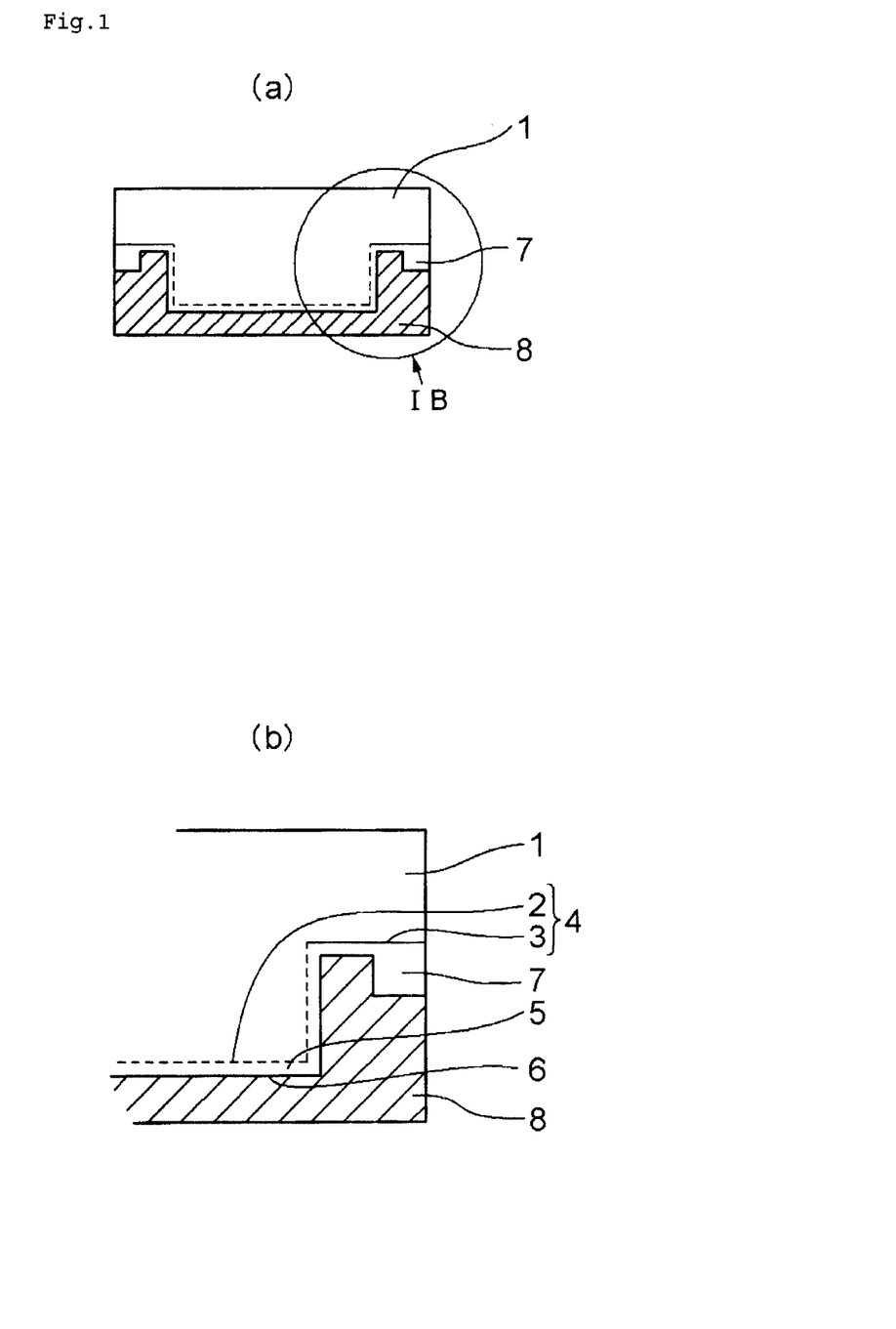
FIG. 1 are end face machining sectional views of the metallic surface layer member.
Figure 2:
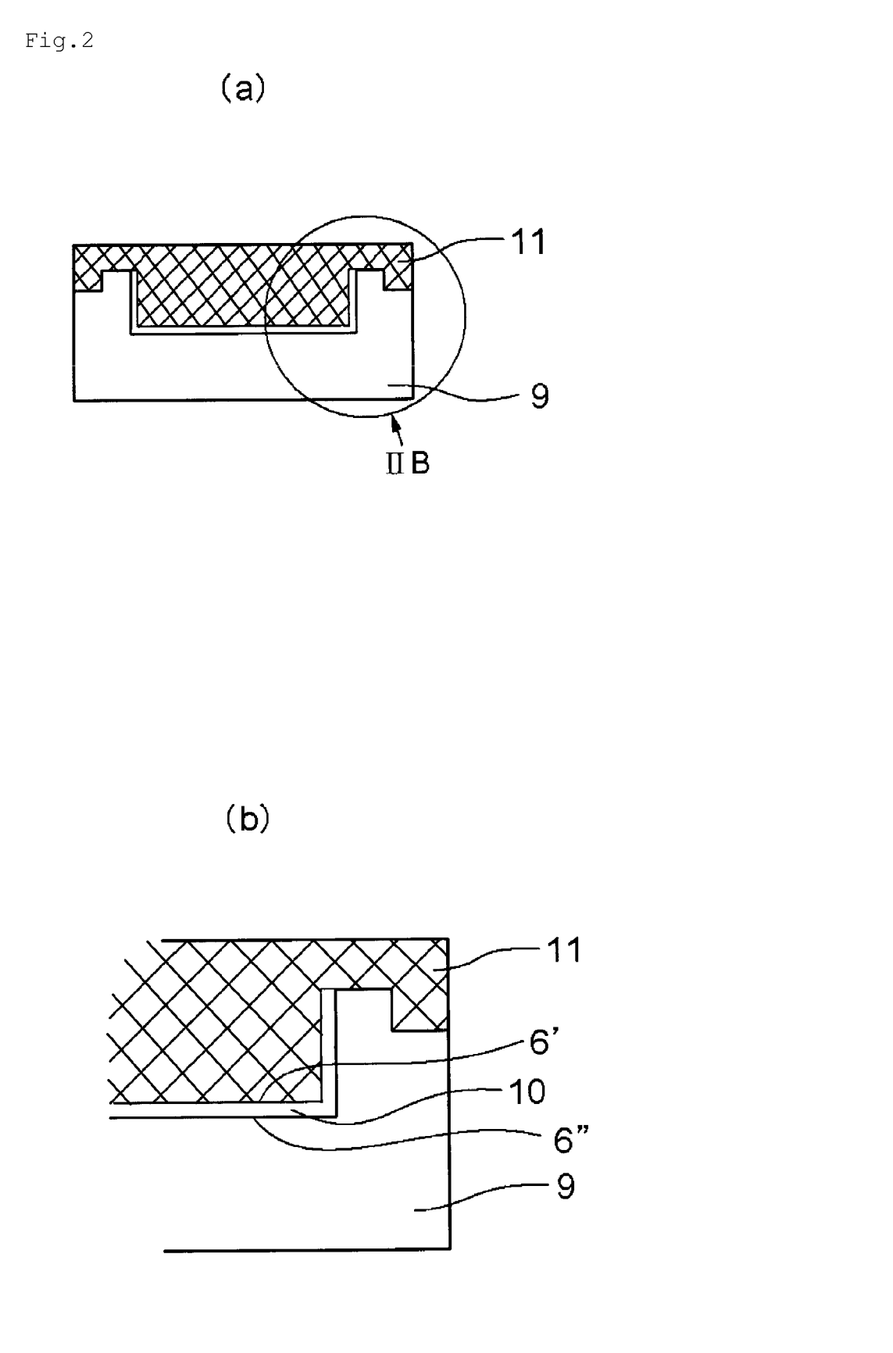
FIG. 2 are end face machining sectional views of the cavity main body member.
Figure 3:
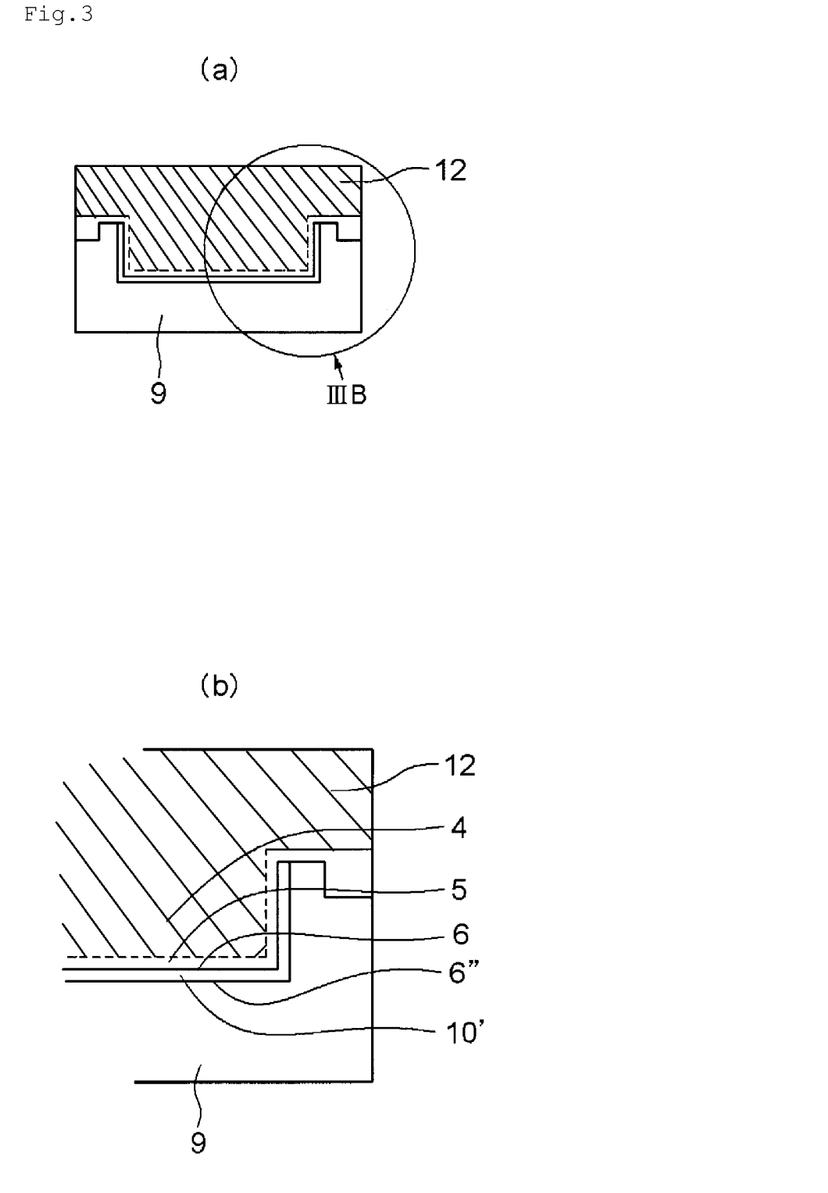
FIG. 3 are sectional views of joining of both members and finishing of the metallic layer member.
Figure 4:
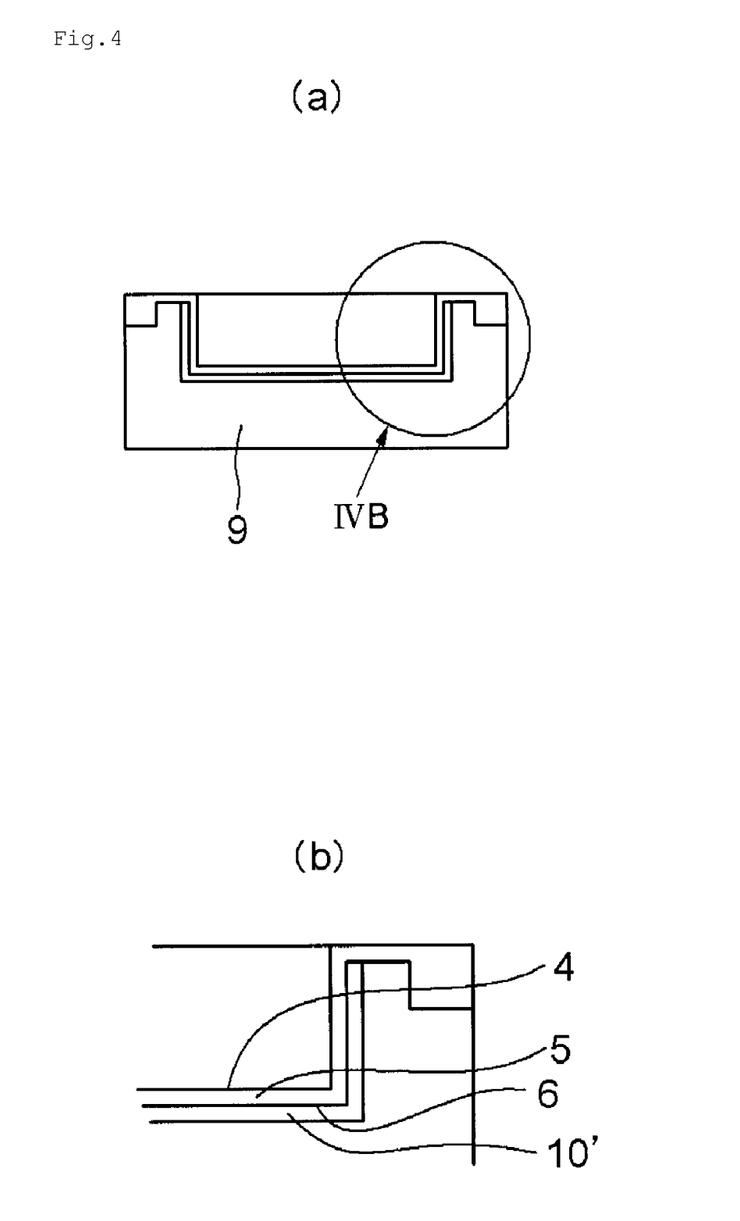
FIG. 4 are sectional views of the heat-insulating cavity mold.
Figure 7:
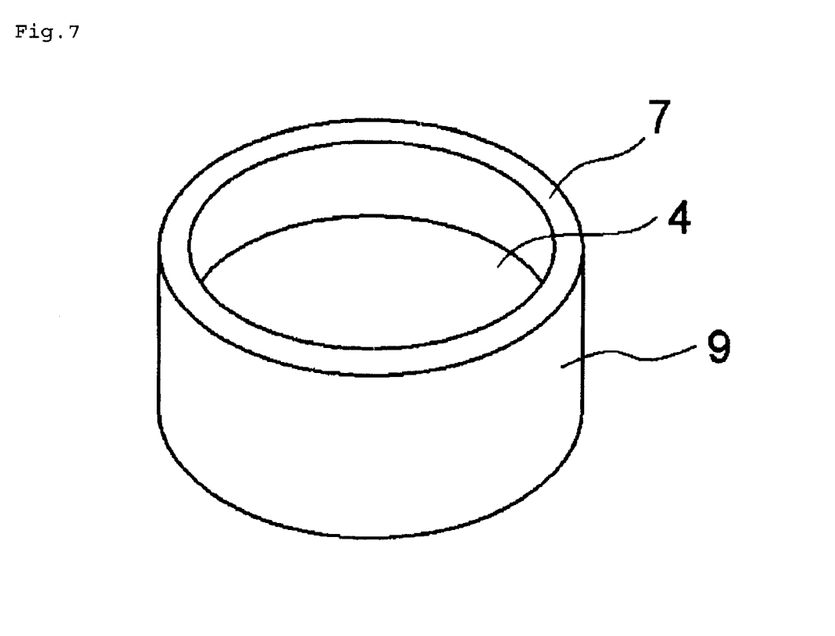
FIG. 7 is an external view of the heat-insulating cavity mold.

FIG. 1 to FIG. 4 show the heat-insulating cavity mold producing method of the present invention. FIG. 1 to FIG. 4 are conceptual views of the first embodiment, and FIG. 1 are end face machining sectional views of the metallic surface layer member, FIG. 2 are end face machining sectional views of the cavity main body member, FIG. 3 are sectional views of joining of both members and finishing of the metallic layer member, and FIG. 4 are sectional views of the heat-insulating cavity mold for a molding shape of a columnar mold shape of 50 mm diameter×10 mm height. (b) of these figures are enlarged views of parts IIB, IIIB, and IVB. FIG. 7 is an external view of the heat-insulating cavity mold of the columnar mold shape.

First, in FIG. 1, on an end face of the metallic surface layer member 1 made of a mold stainless steel (trade name: NAC101, heat conductivity: 0.04 cal/cm·sec·° C.), a metallic surface layer member fitting surface 6 having an offset of the thickness (0.15 mm) of the metallic surface layer 5 from the heat-insulating cavity mold surface 4 consisting of a molding shaped portion 2 of 50 mm diameter×10 mm height and a parting portion 3 was formed, and on the outer periphery thereof, an unnecessary portion (1)8 was eliminated by machining such as milling or discharge machining while a centering location outer wall 7 is left.

On the other hand, as shown in FIG. 2, on an end face of the cavity main body member 9 made of a mold aluminum alloy (made by Hakudo, trade name: YH75, heat conductivity: 0.31 cal/cm·sec·° C.), a fitting surface 6' of the cavity main body member which was an inversion of the fitting surface 6 of the metallic surface layer member was formed, and this molding shaped portion was engraved (1 mm) into the offset shape, and a cavity main body concaved fitting surface 6" provided with a heat-insulating layer forming concave portion 10 on the fitting surface 6' of the cavity main body member was formed by eliminating an unnecessary portion (2)11 by machining such as milling or discharge machining.

The fitting surfaces 6 and 6" of both members were roughened by sandblasting, and in the heat-insulating layer forming concave portion 10, a heat insulating layer was formed of a glass fiber reinforced heat-resistant composite resin heat-insulating material, and after it was cured, the fitting surface 6' of the cavity main body was re-formed by milling or discharge machining, etc.

Next, as shown in FIG. 3, an adhesive material was applied onto the fitting surfaces 6 and 6' of the members and these surfaces were fitted to each other, and pressure-bonded by heat pressing.

After the members were integrated, the metallic surface layer 5 (thickness: 0.15 mm) from the fitting surface 6 was left and the remaining unnecessary portion (3) 12 of the metallic surface layer member was eliminated by milling or discharge machining, etc., whereby a heat-insulating cavity mold surface 4 was formed.

Last, as shown in FIG. 4, the mold surface was polished and the outer periphery was machined into predetermined dimensions, whereby a heat-insulating cavity mold (external shape is shown in FIG. 7) of the present invention which included a heat-insulating layer 10' on the cavity mold surface and the metallic surface layer 5 further formed on the heat-insulating layer was completed.

Figure 5:
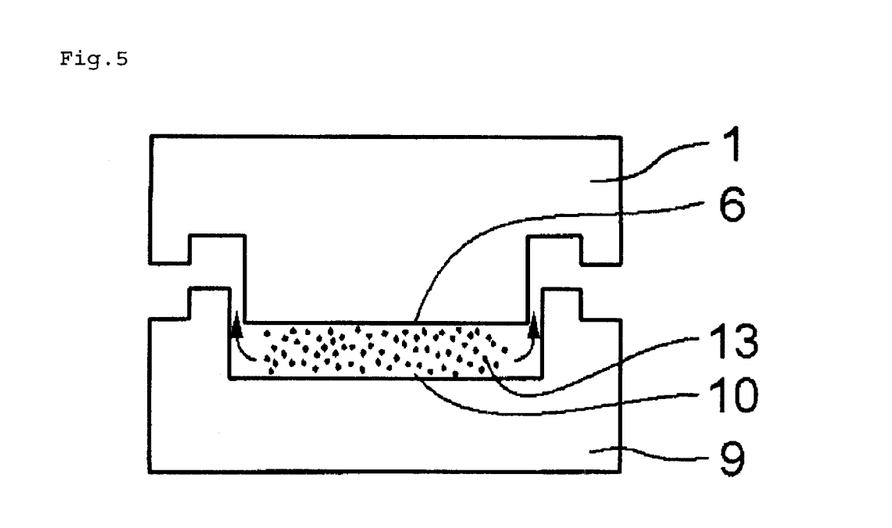
FIG. 5 is a formation and joining sectional view of the heat-insulating layer of the second embodiment.

FIG. 5 is a conceptual view of a second embodiment of the present invention.

This figure is a sectional view showing a method for forming heat-insulating layers of both members on which fitting surfaces were formed and joining these.

The members 1 and 9 on which the same fitting surfaces as in the first embodiment were machined were attached to a heat pressing machine by opposing these vertically, and a glass fiber reinforced heat-resistant composite resin heat-insulating material 13 which flowed under heating and pressurizing was disposed in the heat-insulating layer forming concave portion 10.

Further, a heat-insulating cavity mold of the present invention was manufactured in the same manner as in the first embodiment except that heat-insulating layers were formed and joined integrally while the members were fitted to each other by heating and pressurizing via the material and concave portion.

Figure 6:
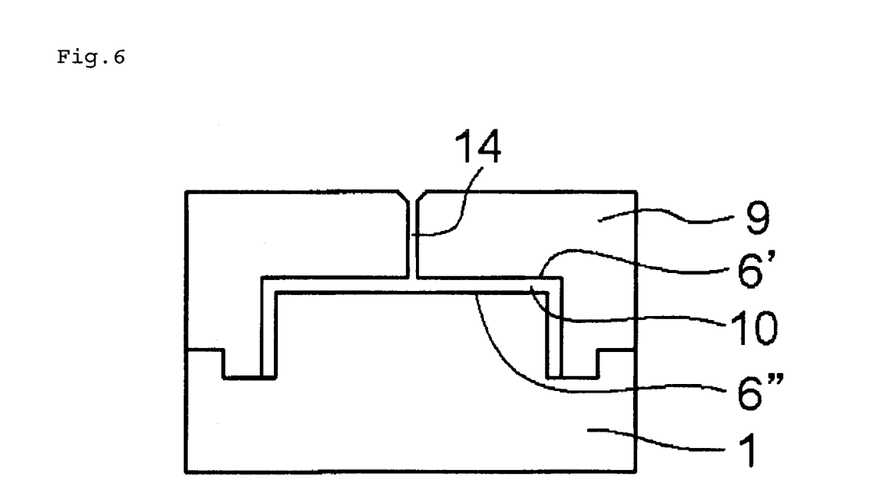
FIG. 6 is a formation and joining sectional view of the heat-insulating layer of the third embodiment.

FIG. 6 is a conceptual view of a third embodiment of the present invention.

A through hole 14 leading to the heat-insulating layer forming concave portion 10 of the fitting surface from the back surface of the cavity main body member 9 was provided, and both members 9 and 1 machined in the same manner as in the first embodiment were attached to a transfer molding machine and fitted to each other.

Thereafter, the glass fiber reinforced heat-resistant composite resin heat-insulating material was pressure-poured into the heat-insulating layer forming concave portion 10 via the through hole 14, the heat-insulating layers were formed, and concurrently, the members were joined, and except for these, the heat-insulating cavity mold of the present invention was manufactured in the same manner as in the first embodiment.

The thickness of the metallic surface layer is preferably 0.1 to 0.5 mm, however, in terms of strength, machinability, and formation of a surface pattern, or repair, etc., the thickness is most preferably 0.15 to 0.2 mm. The thicker the metallic surface layer, the smaller the temperature rising effect on the mold surface, however, in the case of using a low-heat conductivity metal, a certain level of temperature rising effect is obtained.

The smaller the heat conductivity of the metallic surface layer, the better. Even an iron-based steel material is more preferable than electroformed nickel, and a titanium alloy, etc., with smaller heat conductivity is more preferable still.

The higher the heat conductivity of the cavity main body member, the better. Preferably, the heat conductivity is not less than 0.31 cal/cm·sec·° C. which is the heat conductivity of an aluminum alloy material (JIS A7075).

When a molding machine to be used is for 100-ton or higher-class molds, according to the allowable strength and expansion coefficient, etc., thereof, a copper alloy is more preferable as the material of the cavity main body member than aluminum-based materials.

For machining the heat-insulating layer forming concave portion, discharge machining which commonly works as roughening is also preferably used.

The lower the heat conductivity of the heat-insulating layer, the better, and preferably, $8 \times 10^{-3}$ cal/cm·sec·° C. or less and the thickness thereof is preferably 0.1 to 2.0 mm, and more preferably, the heat conductivity is $5 \times 10^{-3}$ cal/cm·sec·° C. or less and the thickness is 0.3 to 1.0 mm.

When the core mold is made of a mold release heat-resistant resin composite material, if the heat conductivity is excessively low, it becomes wettable with the filled resin, so that the heat conductivity is preferably about $3 \times 10^{-2}$ to $7 \times 10^{-3}$ cal/cm·sec·° C.

By forming a thin-film surface layer (for example, $SiO_2$ film) with excellent wettability on the surface of the cavity mold, wettability with molten resin is improved, the mold release temperature is lowered, and the sink preventive function is improved.

Example 1

Two heat-insulating cavity molds for a columnar molding of 50 mm diameter×10 mm height, according to the first embodiment of the present invention, were manufactured.

Two core molds for molding a molding which had a thickness of 1.5 mm, and a boss of a depth of 10 mm and a diameter of 2.0φ on the back surface by using the cavity mold were manufactured by using iron of S55C and a stainless steel alloy of NAC101, and the core molds were combined with the cavity mold, respectively, to prepare two mold sets.

On the other hand, a side gate type two-cavity standard two-plate mold was manufactured, and in one side thereof, a mold set using the iron-made core mold as a heat-insulating mold 3 of the present invention was incorporated, and in the other side, a mold set using the stainless steel alloy-made core mold as a heat-insulating mold 4 of the present invention was incorporated, whereby a multimolding mold was made. To both cavities, pressure sensors were attached so as to measure the mold internal pressures.

This mold was attached to an injection molding machine (80EPN made by TOSHIBA MACHINE), and by using ABS 330 (resin temperature: 220° C.) made by Technopolymer, two moldings were molded simultaneously under conditions of a mold temperature of 80° C., an injection speed of 50%, and a pressure keeping time of 3 seconds while the keeping pressure was variously changed.

With the heat-insulating mold 3 of the present invention (combination mold of the heat-insulating cavity mold of the present invention and an iron-made core mold), a molding which had a surface (cavity side) beautifully transferred without sink marks at the boss at a mold internal keeping pressure in the range of 200 to 450 kgf/cm², and had sink marks on the back surface (core side), was obtained.

At a higher pressure, the core surface was transferred, and sink marks increased on the cavity surface.

With the heat-insulating mold 4 of the present invention (combination mold of the heat-insulating cavity mold of the present invention and a stainless steel-based core mold), a molding which had a surface beautifully transferred in a wider condition range of the mold internal keeping pressure from 150 kgf/cm² to 100 kgf/cm², and had sink marks on the back surface, was obtained.

Example 2

A multimolding mold including heat-insulating molds 5 and 6 of the present invention was manufactured in the same manner as in Example 1 except that a thin film of silicon dioxide was formed by a sputtering system on the surfaces of the metallic surface layers in the heat-insulating cavity molds of the present invention, and with both of these molds, injection molding was performed in the same manner as in Example 1.

As a result, when the heat-insulating cavity mold of the present invention including the silicon dioxide thin film was used, the same moldings as in Example 1 (the heat-insulating cavity mold of the present invention having no silicon dioxide thin film) were obtained at a molding temperature of 60° C. that was 10° C. lower than the molding temperature of Example 1.

DESCRIPTION OF REFERENCE NUMERALS

1 Metallic surface layer member
2 Molding surface shaped portion
3 PL (parting line) portion
4 Heat-insulating cavity mold surface (surface combining 2 and 3)
5 Metallic surface layer
6 Metallic surface layer member fitting surface
6' Cavity main body member fitting surface
6" Cavity main body concaved fitting surface
7 Centering location outer wall
8 Unnecessary portion (1)
9 Cavity main body member
10 Heat-insulating material forming concave portion
10' Heat insulating layer
11 Unnecessary portion (2)
12 Unnecessary portion (3)
13 Glass fiber reinforced heat-resistant composite resin heat-insulating material
14 Through hole
101 Heat-insulating layer
102 Cavity mold
103 Metallic layer
104 Mold release heat-insulating layer
105 Cavity part
106 Spool
107 Gate
108 Core mold
109 Attaching plate
110 Nozzle touch portion
111 Projecting pin
113 Core plate

INDUSTRIAL APPLICABILITY

The present invention relates to a cavity mold to be used in a mold for injection-molding a thermoplastic resin. A cavity mold of the present invention relates to a thermoplastic resin molding heat-insulating mold with which the luster and fine uneven patterns on its surface can be faithfully transferred onto a molding surface, and a beautiful molding in which an internal stress and distortion are minimized, and no sink marks occur on the surface can be molded at a low pressure or an extremely low pressure, and more specifically, the heat insulating mold is manufactured by machining, so that an appropriate material can be selected, and a mold and molding which have high performance stability over a long period of time and high practicability can be manufactured.

What is claimed is:

1. A method for producing a cavity mold, the method comprising the steps of:
manufacturing each of a metallic surface layer member (MSLM) having an MSLM end face and a cavity main body member (CMBM) having a CMBM end face;
making a fitting surface on each of the MSLM and CMBM end faces at least in part by machining the MSLM and CMBM, the MSLM fitting surface having a centering location outer wall;
roughening each of the MSLM and CMBM fitting surfaces;
forming on the roughened CMBM fitting surface a heat-insulating layer which with the CMBM fitting surface forms a concave inverse of the MSLM fitting surface;
joining and integrating the roughened MSLM fitting surface with the CMBM fitting surface via the heat-insulating layer, an overhanging portion of the MSLM centering wall abutting the heat-insulating layer at a terminating edge of the heat-insulating layer facing neither of a cavity mold surface nor the CMBM; and
eliminating an unnecessary portion of the joined MSLM to form a concave cavity-shaped metallic surface layer.

2. The method according to claim 1, further comprising providing the cavity mold for use with a core mold in thermoplastic injection molding.

3. The method according to claim 1, wherein the MSLM end face is shaped to offset a thickness of the metallic surface layer from the cavity mold surface.

4. The method according to claim 1, wherein said roughening is conducted by at least one of sandblasting and discharge machining.

5. The method according to claim 1, wherein the heat-insulating layer is formed by curing glass fiber reinforced heat-resistant composite resin.

6. The method according to claim 5, further comprising re-forming the CMBM fitting surface after said curing by milling or discharge machining.

7. The method according to claim 1, wherein said joining and integrating is conducted by:
applying adhesive to the MSLM and CMBM;
fitting the MSLM and CMBM to each other; and
pressure-bonding the MSLM and CMBM by heat pressing.

8. The method according to claim 1, further comprising polishing the cavity mold surface.

9. The method according to claim 1, wherein the metallic surface layer has a thickness of 0.1 to 0.5 mm.

10. The method according to claim 1, wherein the heat-insulating layer has a thickness of 0.2 to 2.0 mm.

11. The method according to claim 1, wherein the MSLM is formed from stainless steel having a heat conductivity of 0.04 cal/cm*s*° C.

12. The method according to claim 1, wherein the CMBM is formed from an aluminum alloy having a heat conductivity of 0.31 cal/cm*s*° C.

* * * * *